Aug. 22, 1961  R. L. McLEAN  2,997,024
ROCK DRILL COLLAR
Filed Jan. 13, 1960
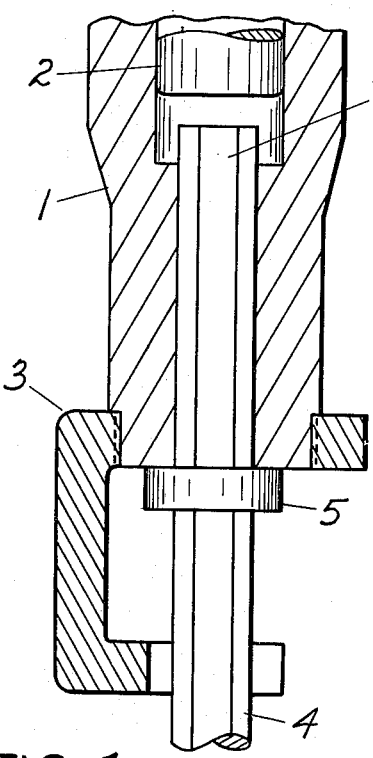
FIG. 1
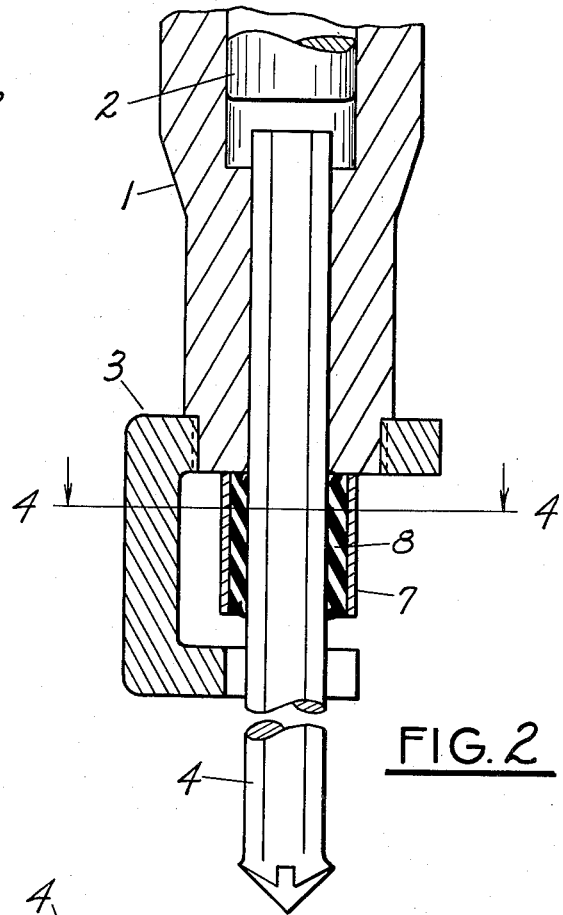
FIG. 2
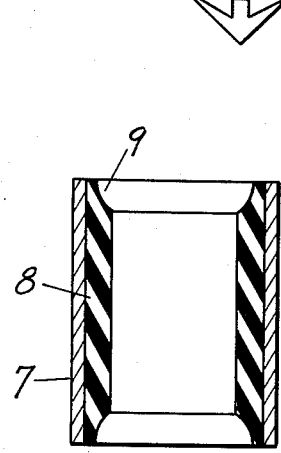
FIG. 3
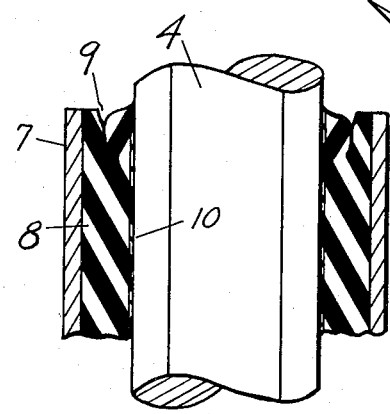
FIG. 5
FIG. 4
INVENTOR.
Ronald L. McLean
BY Ralph Hammar
attorney United States Patent Office 2,997,024
Patented Aug. 22, 1961

2,997,024
ROCK DRILL COLLAR
Ronald L. McLean, Erie, Pa., assignor to Lord Manufacturing Company, Erie, Pa., a corporation of Pennsylvania
Filed Jan. 13, 1960, Ser. No. 2,219
1 Claim. (Cl. 121—32)

This application is an improvement on United States Patent 2,889,811, which discloses a rock drill bit collar having several longitudinally displaced sleeves of rubber. It is there stated: "If the resilient material was fabricated as one continuous sleeve, without any grooves, the material would quickly lose its elastic properties during operation of the tool and the flange would have to be replaced." According to my invention, the collar (flange) is made with one continuous sleeve, much shorter than that shown in Patent 2,889,811 and without any grooves and superior performance is obtained. This is achieved by bonding the rubber sleeve to the inside of a metal sleeve and by pressing the rubber sleeve onto the drill bit, using a rubber to metal adhesive as a lubricant for assembly. When the rubber sleeve is pressed in place, the adhesive sets up and provides a rubber to metal bond with the bit more than adequate to withstand any load which will ever be placed on the collar during service. By using a single sleeve, the length of the collar is reduced so that a bit with my collar can be used interchangeably in a rock drill for bits having forged metal collars.

In the drawing, FIG. 1 is a side view, partly in cross section, of a rock drill bit with a forged collar; FIG. 2 is a similar view of the same tool with the collar of the present invention; FIG. 3 is a longitudinal section of the collar prior to assembly on the bit; FIG. 4 is a section on line 4—4 of FIG. 2; and FIG. 5 is an enlarged fragmentary longitudinal section through the collar and bit.

The parts of the conventional rock drill shown in FIG. 1 are readily identified, 1 being the cylinder, 2 the piston, 3 the retaining link fixed to the cylinder and 4 the drill bit with an integrally forged collar 5 confined between the lower end of the cylinder and the retaining link. Under normal drilling conditions, the upper end 6 of the bit is struck by the piston 2 at a frequency of the order of 25 cycles per second. Most of the energy imparted to the bit by the piston is used in breaking the rock. The collar 5 fails due to fatigue caused by ringing of the steel bit at its natural frequency when struck by the driver piston 2. The life of the collar depends upon the quality of the forging. For a drill bit having a life of 700 hours, the failure of the collar averages to occur after about 80 hours of drilling. After the failure, the bit must be reforged to form a new collar.

In FIG. 2, the same rock drill is shown with the drill bit equipped with a collar having the construction illustrated in FIGS. 3 and 4. In the as molded condition, the collar comprises a metal sleeve 7 with an internal rubber sleeve 8 bonded to the inner surface of the metal sleeve 7. The axial length of the rubber sleeve 8 is a minimum at its inside diameter and increases to a maximum at its outside diameter so that in cross section the ends of the rubber sleeve are recessed as indicated at 9. In assembly, the collar is pushed onto the upper end of the rod using a rubber to metal adhesive both as a lubricant for the assembly and as a bonding agent after assembly. The adhesive is indicated at 10 in FIG. 5. During assembly, the rubber sleeve 8 is compressed between the bit 4 and the metal sleeve 7 causing the rubber to bulge outwardly and to substantially fill the recesses 9. From one aspect, the recess protects the ends of the rubber sleeve and prevents injury to the adhesive connection to the drill bit at the outer ends where failure is likely to start. This contributes to the non slipping grip on the drill bit without loss of the elastic properties of the rubber. After assembly, the rubber is substantially flush with or slightly inside the ends of the metal sleeve 7. As molded, the rubber sleeve has a circular bore. It is not necessary that the bore of the sleeve conform to the shape of the drill bit. During assembly, the rubber readily conforms to any shape of drill rod, for example the standard hexagonal shape illustrated.

The bonding of the rubber sleeve 8 to the inner surface of the metal sleeve 7 and the adhesive connection of the rubber sleeve 8 to the outer surface of the drill bit provides a non slipping grip on the drill bit without loss of the elastic properties of the rubber. If the compression of the rubber between the sleeve and drill bit were relied upon to provide the sole gripping force, the rubber would have to be so greatly compressed that it would quickly lose its elastic properties as described in Patent 2,889,811. Also, at low temperatures there is a shrinkage of the rubber which would cause a still further reduction in the gripping force if the compression of the rubber were the sole gripping force. The present construction, which is bonded on both the inner and outer surfaces, provides adequate gripping action over all temperatures encountered in service. Furthermore, the collar would have to be a great deal longer as illustrated in the patent and would require redesign of the link 3.

With the present collar, there is no failure of the collar during normal drilling. The rubber sleeve is not subject to fatigue under these conditions.

Furthermore, the present collar is able to withstand the most severe conditions encountered in service, namely when the drill bit becomes stuck in rock. When this happens, the drill bit is removed by pulling the drill away from the work with a hydraulic ram exerting a force of 300 or more pounds. Under this condition, the shifting link 3 is pulled up against the lower end of the collar and the drill turned on. This results in an additional force on the collar of plus or minus 500 pounds at the operating frequency of the drill, e.g. 25 cycles per second. To withstand these forces, the joint between the collar and the drill bit must be capable of offering a minimum of 800 pounds resistance to slippage. This minimum is easily exceeded with the present collar.

The present collar has never failed in service. As compared to a life of 80 hours with the integrally forged collar, the present collar has lasted for 700 hours of actual drilling. This 700 hour figore was not the life of the collar but was the life of the drill bit on which the collar was installed.

What is claimed as new is:

In a rock drill having a cylinder, a drive piston, said cylinder slidably receiving one end of a drill bit to be struck by the piston, and a retaining link having an opening spaced from the cylinder through which the drill bit extends, the combination of a collar on the bit of diameter greater than said opening and of length less than the spacing of the link from the cylinder to permit normal reciprocation of the bit, said collar having an outer metal sleeve, an inner rubber sleeve with its outer surface bonded to the inner surface of the metal sleeve, said rubber sleeve in its as molded condition having a bore of lesser diameter than the drill bit and having an axial length increasing from the inside toward the outside to provide recesses at the ends of the rubber sleeve, said rubber sleeve when installed on the drill bit being compressed between the bit and the metal sleeve causing expansion of the rubber to substantially fill said recesses, and a layer of metal to rubber adhesive between the outer surface of the drill bit and the inner surface of the rubber sleeve, the bonding of the rubber sleeve to the inner surface of the metal sleeve and the adhesive connection of the rubber sleeve to the outer surface of the drill bit providing a non slipping grip on the drill bit without loss of the elastic properties of the rubber.

References Cited in the file of this patent

UNITED STATES PATENTS

| | | |
|---|---|---|
| 2,685,274 | Liddicoat | Aug. 3, 1954 |
| 2,830,792 | Sears | Apr. 15, 1958 |
| 2,889,811 | Guillemier | June 9, 1959 |

FOREIGN PATENTS

| | | |
|---|---|---|
| 332,914 | Great Britain | July 14, 1930 |
| 552,305 | Great Britain | Mar. 31, 1943 |
| 1,121,173 | France | July 24, 1956 |